United States Patent
Lauber et al.

(10) Patent No.: US 12,444,174 B2
(45) Date of Patent: Oct. 14, 2025

(54) RARE EVENT TRAINING DATA SETS FOR ROBUST TRAINING OF SEMICONDUCTOR YIELD RELATED COMPONENTS

(71) Applicant: KLA Corporation, Milpitas, CA (US)

(72) Inventors: Jan Lauber, San Francisco, CA (US); Sabyasachi Das, Hsinchu (TW); Jason Kirkwood, Mountain View, CA (US)

(73) Assignee: KLA Corporation, Milpitas, CA (US)

( * ) Notice: Subject to any disclaimer, the term of this patent is extended or adjusted under 35 U.S.C. 154(b) by 175 days.

(21) Appl. No.: 18/502,942

(22) Filed: Nov. 6, 2023

(65) Prior Publication Data

US 2025/0061692 A1 Feb. 20, 2025

Related U.S. Application Data

(60) Provisional application No. 63/532,910, filed on Aug. 16, 2023.

(51) Int. Cl.
*G06V 10/774* (2022.01)
*G06T 7/00* (2017.01)
(Continued)

(52) U.S. Cl.
CPC .......... *G06V 10/774* (2022.01); *G06T 7/0004* (2013.01); *G06V 10/764* (2022.01);
(Continued)

(58) Field of Classification Search
CPC .. G06V 10/774; G06V 10/764; G06V 10/776; G06V 20/70; G06T 7/0004;
(Continued)

(56) References Cited

U.S. PATENT DOCUMENTS 8,126,255 B2 2/2012 Bhaskar et al.
8,664,594 B1 3/2014 Jiang et al.
(Continued)

FOREIGN PATENT DOCUMENTS

| JP | 6516583 | 5/2019 | |
|---|---|---|---|
| KR | 10-2513580 | 3/2023 | |
| WO | WO-2023113773 A1 * | 6/2023 | ........... G06V 10/774 |

OTHER PUBLICATIONS

International Search Report and Written Opinion for PCT/US2024/042218 mailed Nov. 27, 2024.

*Primary Examiner* — Samir A Ahmed
(74) *Attorney, Agent, or Firm* — Entropy Matters LLC

(57) ABSTRACT

Methods and systems for determining information for a specimen are provided. One method includes collecting images of known rare defect types previously detected on one or more other specimens and assigning training labels to the images responsive to the known rare defect types in the images. The method also includes storing the collected images and the assigned training labels as a rare defect type training data set. The rare defect type training data set is unsuitable for use in training a component configured for determining information for the specimen from runtime images generated for the specimen by an imaging system until the rare defect type training data set is combined with training images and corresponding training labels generated for the specimen. The method may also or alternatively perform these steps for known tool excursion events previously detected on one or more additional specimens.

23 Claims, 2 Drawing Sheets

(51) Int. Cl.
*G06V 10/764* (2022.01)
*G06V 10/776* (2022.01)
*G06V 20/70* (2022.01)

(52) U.S. Cl.
CPC ............ *G06V 10/776* (2022.01); *G06V 20/70* (2022.01); *G06T 2207/10061* (2013.01); *G06T 2207/20081* (2013.01); *G06T 2207/20092* (2013.01); *G06T 2207/20212* (2013.01); *G06T 2207/30148* (2013.01)

(58) Field of Classification Search
CPC . G06T 2207/10061; G06T 2207/20081; G06T 2207/20092; G06T 2207/20212; G06T 2207/30148; G06T 2207/20084
See application file for complete search history.

(56) References Cited

U.S. PATENT DOCUMENTS

| | | | |
|---|---|---|---|
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 9,222,895 B2 | 12/2015 | Duffy et al. | |
| 9,816,939 B2 | 11/2017 | Duffy et al. | |
| 10,043,261 B2 | 8/2018 | Bhaskar et al. | |
| 10,186,026 B2 | 1/2019 | Karsenti et al. | |
| 10,360,477 B2 | 7/2019 | Bhaskar et al. | |
| 10,607,119 B2 | 3/2020 | He et al. | |
| 11,580,398 B2 | 2/2023 | Zhang et al. | |
| 2015/0254832 A1 | 9/2015 | Plihal | |
| 2015/0262038 A1 | 9/2015 | Konuru | |
| 2016/0258879 A1 | 9/2016 | Liang et al. | |
| 2017/0082555 A1 | 3/2017 | He et al. | |
| 2017/0193400 A1 | 7/2017 | Bhaskar et al. | |
| 2017/0200264 A1 | 7/2017 | Park et al. | |
| 2018/0107928 A1 | 4/2018 | Zhang et al. | |
| 2019/0096053 A1 | 3/2019 | Asbag et al. | |
| 2019/0370955 A1 | 12/2019 | Zhang et al. | |
| 2020/0234428 A1 | 7/2020 | George et al. | |

\* cited by examiner

RARE EVENT TRAINING DATA SETS FOR ROBUST TRAINING OF SEMICONDUCTOR YIELD RELATED COMPONENTS

BACKGROUND OF THE INVENTION

1. Field of the Invention

The present invention generally relates to methods and systems for determining information for a specimen. Certain embodiments relate to training data sets containing primarily rare defect and/or tool excursion events that can be combined with specimen-specific training data sets for robust training of a component configured for determining information for a specimen.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on specimens to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Defect review typically involves re-detecting defects detected as such by an inspection process and generating additional information about the defects at a higher resolution using either a high magnification optical system or a scanning electron microscope (SEM). Defect review is therefore performed at discrete locations on specimens where defects have been detected by inspection. The higher resolution data for the defects generated by defect review is more suitable for determining attributes of the defects such as profile, roughness, more accurate size information, etc. Defects can generally be more accurately classified into defect types based on information determined by defect review compared to inspection.

The application of machine learning (ML) algorithms in binning and classification of defects has been well established for awhile. The accuracy of these deep learning (DL) models depends heavily on the set of images that they were trained on. DL models often fail to recognize defects that are either not present or under-represented in the labelled training set. If a particular defect of interest (DOI), which is important to the user, is missed by the model or classified as a nuisance defect, the model could be rejected altogether.

Some currently used ML binning and classification methods try to improve the performance of the models by accumulating a lot more data labeled with user classified ground truth and significantly increased training time, but with no guarantee that any individual rare event will subsequently be correctly classified by the model. Trying to improve performance in this manner greatly increases the work load of the operator, who needs to SEM review and classify a much larger set of inspection data in order to be certain that all possible eventualities have been identified and included in the training data set. Such approaches will therefore significantly increase the time-to-results while still not being able to guarantee that a rare event will be correctly identified. Therefore, currently used ML binning and classification methods are prone to misclassifying rare events that are not present or under-represented in the training set.

Accordingly, it would be advantageous to develop systems and methods for generating training data sets for components configured for determining information for a specimen that do not have one or more of the disadvantages described above.

SUMMARY OF THE INVENTION

The following description of various embodiments is not to be construed in any way as limiting the subject matter of the appended claims.

One embodiment relates to a system configured for determining information for a specimen. The system includes one or more computer systems configured for collecting images of known rare defect types previously detected on one or more other specimens and assigning training labels to the images responsive to the known rare defect types in the images. The one or more computer systems are also configured for storing the collected images and the assigned training labels as a rare defect type training data set. The rare defect type training data set is unsuitable for use in training a component configured for determining information for the specimen from runtime images generated for the specimen by an imaging system until the rare defect type training data set is combined with training images and corresponding training labels generated for the specimen. The system may be further configured as described herein.

Another embodiment relates to a computer-implemented method for determining information for a specimen. The method includes the collecting, assigning, and storing steps described above, which are performed by one or more computer systems. Each of the steps of the method may be performed as described further herein. The method may include any other step(s) of any other method(s) described herein and may be performed by any of the systems described herein.

Another embodiment relates to a non-transitory computer-readable medium storing program instructions executable on a computer system for performing a computer-implemented method for determining information for a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
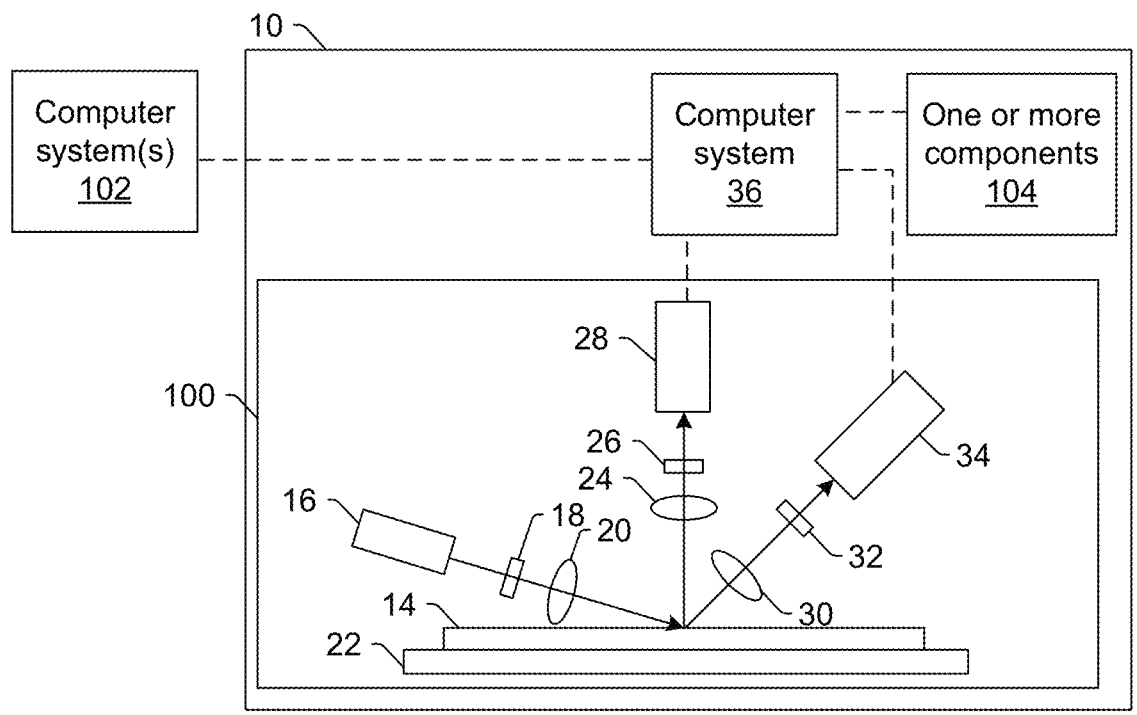
FIGS. 1 and 2 are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are configured for determining information for a specimen. The embodiments described herein are particularly suitable for deep learning (DL) model stabilization using template images for more robust event binning and defect of interest (DOI) recovery in dark field (DF) wafer inspection tools. However, as described further herein, the embodiments have other applications and uses and may be configured for one or more of these features.

"Nuisances" (which is sometimes used interchangeably with "nuisance defects") as that term is used herein is generally defined as defects that a user does not care about and/or events that are detected on a specimen but are not really actual defects on the specimen. Nuisances that are not actually defects may be detected as events due to non-defect noise sources on a specimen (e.g., grain in metal lines on the specimen, signals from underlaying layers or materials on the specimen, line edge roughness (LER), relatively small critical dimension (CD) variation in patterned attributes, thickness variations, etc.) and/or due to marginalities in the inspection system itself or its configuration used for inspection.

The term "defects of interest (DOIs)" as used herein is defined as defects that are detected on a specimen and are really actual defects on the specimen. Therefore, the DOIs are of interest to a user because users generally care about how many and what kind of actual defects are on specimens being inspected. In some contexts, the term "DOI" is used to refer to a subset of all of the actual defects on the specimen, which includes only the actual defects that a user cares about. For example, there may be multiple types of DOIs on any given specimen, and one or more of them may be of greater interest to a user than one or more other types.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

One embodiment of a system configured for determining information for a specimen is shown in FIG. 1. In some embodiments, system 10 includes imaging system 100. The imaging system includes and/or is coupled to a computer system, e.g., computer system 36 and/or one or more computer systems 102. In general, the imaging systems described herein include at least an energy source, a detector, and a scanning subsystem. The energy source is configured to generate energy that is directed to a specimen by the imaging system. The detector is configured to detect energy from the specimen and to generate output responsive to the detected energy. The scanning subsystem is configured to change a position on the specimen to which the energy is directed and from which the energy is detected. In one embodiment, as shown in FIG. 1, the imaging system is configured as a light-based imaging system.

In the light-based imaging systems described herein, the energy directed to the specimen includes light, and the energy detected from the specimen includes light. For example, as shown in FIG. 1, the imaging system includes an illumination subsystem configured to direct light to specimen 14. The illumination subsystem includes at least one light source, e.g., light source 16. The illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the process being performed on the specimen.

The illumination subsystem may be configured to direct the light to the specimen at different angles of incidence at different times. For example, the imaging system may be configured to alter one or more characteristics of one or more elements of the illumination subsystem such that the light can be directed to the specimen at an angle of incidence that is different than that shown in FIG. 1. In one such example, the imaging system may be configured to move light source 16, optical element 18, and lens 20 such that the light is directed to the specimen at a different oblique angle of incidence or a normal (or near normal) angle of incidence.

In some instances, the imaging system may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, optical element 18 may be configured as a spectral filter and the properties of the spectral filter can be changed in a variety of different ways (e.g., by swapping out one spectral filter with another) such that different wavelengths of light can be directed to the specimen at different times. The illumination subsystem may have any other suitable configuration known in the art for directing light having different or the same characteristics to the specimen at different or the same angles of incidence sequentially or simultaneously.

Light source 16 may include a broadband plasma (BBP) light source. In this manner, the light generated by the light source and directed to the specimen may include broadband light. However, the light source may include any other suitable light source such as any suitable laser known in the art configured to generate light at any suitable wavelength(s). The laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for imaging.

The imaging system may also include a scanning subsystem configured to cause the light to be scanned over the specimen. For example, the imaging system may include stage 22 on which specimen 14 is disposed during imaging. The scanning subsystem may include any suitable mechanical and/or robotic assembly (that includes stage 22) that can be configured to move the specimen such that the light can be directed to and detected from different positions on the specimen. In addition, or alternatively, the imaging system may be configured such that one or more optical elements of the imaging system perform some scanning of the light over the specimen such that the light can be directed to and detected from different positions on the specimen. The light may be scanned over the specimen in any suitable fashion such as in a serpentine-like path or in a spiral path.

The imaging system further includes one or more detection channels. At least one of the detection channel(s) includes a detector configured to detect light from the specimen due to illumination of the specimen by the imaging system and to generate output responsive to the detected light. For example, the imaging system shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels and the illumination subsystem are positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging system that includes two detection channels, the imaging system may include a different number of detection channels (e.g., only one detection channel or two or more detection channels). In one such instance, the detection channel formed by collector 30, element 32, and detector 34 may form one side channel as described above, and the imaging system may include an additional detection channel (not shown) formed as another side channel that is positioned on the opposite side of the plane of incidence. Therefore, the imaging system may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging system may also include two or more side channels configured as described above. As such, the imaging system may include at least three channels (i.e., one top channel and two side channels), and each of the at least three channels has its own collector, each of which is configured to collect light at different scattering angles than each of the other collectors.

As described further above, each of the detection channels included in the imaging system may be configured to detect scattered light. Therefore, the imaging system shown in FIG. 1 may be configured for dark field (DF) imaging of specimens. In this manner, in one embodiment, the imaging system is configured as a light scattering DF inspection system. However, the imaging system may also or alternatively include detection channel(s) that are configured for bright field (BF) imaging of specimens. In other words, the imaging system may include at least one detection channel that is configured to detect light specularly reflected from the specimen. Therefore, the imaging systems described herein may be configured for only DF, only BF, or both DF and BF imaging. Although each of the collectors are shown in FIG. 1 as single refractive optical elements, each of the collectors may include one or more refractive optical elements and/or one or more reflective optical elements.

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the imaging system may be signals or data, but not image signals or image data. In such instances, a computer system such as computer system 36 may be configured to generate images of the specimen from the non-imaging output of the detectors. However, in other instances, the detectors may be configured as imaging detectors that are configured to generate imaging signals or image data. Therefore, the imaging system may be configured to generate images in a number of ways.

FIG. 1 is provided herein to generally illustrate a configuration of an imaging system that may be included in the embodiments described herein. Obviously, the imaging system configuration described herein may be altered to optimize the performance of the imaging system as is normally performed when designing a commercial imaging system. In addition, the systems described herein may be implemented using an existing system (e.g., by adding functionality described herein to an existing inspection system) such as tools that are commercially available from KLA Corp., Milpitas, Calif. For some such systems, the methods described herein may be provided as optional functionality of the system (e.g., in addition to other functionality of the system). Alternatively, the system described herein may be designed "from scratch" to provide a completely new system.

Computer system 36 may be coupled to the detectors of the imaging system in any suitable manner (e.g., via one or more transmission media, which may include "wired" and/ or "wireless" transmission media) such that the computer system can receive the output generated by the detectors. Computer system 36 may be configured to perform a number of functions using the output of the detectors. For instance, if the system is configured as inspection system, the computer system may be configured to detect defects on the specimen using the output of the detectors. Detecting the defects on the specimen may be performed as described further herein.

Computer system 36 may be further configured as described herein. For example, computer system 36 may be configured to perform the steps described herein. As such, the steps described herein may be performed "on-tool," by a computer system that is coupled to or part of an imaging system. In addition, or alternatively, computer system(s) 102 may perform one or more of the steps described herein. Therefore, one or more of the steps described herein may be performed "off-tool," by a computer system that is not directly coupled to an imaging system.

Computer system 36 (as well as other computer systems described herein) may also be referred to herein as computer subsystem(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer system, then the different computer systems may be coupled to each other such that images, data, information, instructions, etc. can be sent between the computer systems. For example, computer system 36 may be coupled to computer system(s) 102 as shown by the dashed line in FIG. 1 by any suitable transmission media, which may include any suitable wired and/or wireless transmission media known in the art. Two or more of such computer systems may also be effectively coupled by a shared computer-readable storage medium (not shown).

Although the imaging system is described above as being an optical or light-based imaging system, in another embodiment, the imaging system is configured as an electron beam imaging system. In an electron beam imaging system, the energy directed to the specimen includes electrons, and the energy detected from the specimen includes electrons. In one such embodiment shown in FIG. 2, the imaging system includes electron column 122, and the system includes computer system 124 coupled to the imaging system. Computer system 124 may be configured as described above. In addition, such an imaging system may be coupled to another one or more computer systems in the same manner described above and shown in FIG. 1.

Figure 2:
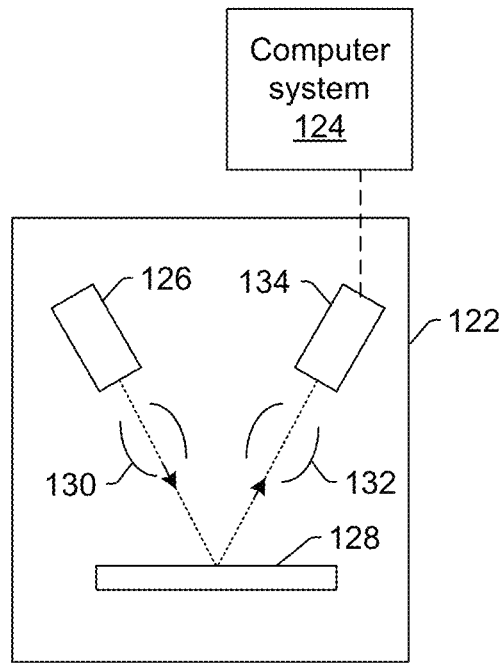

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, the electron beam may be directed to and scattered from the specimen at any suitable angles. In addition, the electron beam imaging system may be configured to use multiple modes to generate output for the specimen as described further herein (e.g., with different illumination angles, collection angles, etc.). The multiple modes of the electron beam imaging system may be different in any output generation parameters of the imaging system.

Computer system 124 may be coupled to detector 134 as described above. The detector may detect electrons returned from the surface of the specimen thereby forming electron beam images of (or other output for) the specimen. The electron beam images may include any suitable electron beam images. Computer system 124 may be configured to detect defects on the specimen using output generated by detector 134, which may be performed as described further herein. Computer system 124 may be configured to perform any additional step(s) described herein. A system that includes the imaging system shown in FIG. 2 may be further configured as described herein.

FIG. 2 is provided herein to generally illustrate a configuration of an electron beam imaging system that may be included in the embodiments described herein. As with the optical imaging system described above, the electron beam imaging system configuration described herein may be altered to optimize the performance of the imaging system as is normally performed when designing a commercial system. In addition, the systems described herein may be implemented using an existing system (e.g., by adding functionality described herein to an existing system) such as tools that are commercially available from KLA. For some such systems, the methods described herein may be provided as optional functionality of the system (e.g., in addition to other functionality of the system). Alternatively, the system described herein may be designed "from scratch" to provide a completely new system.

Although the imaging system is described above as being a light or electron beam imaging system, the imaging system may be an ion beam imaging system. Such an imaging system may be configured as shown in FIG. 2 except that the electron beam source may be replaced with any suitable ion beam source known in the art. In addition, the imaging system may include any other suitable ion beam imaging system such as those included in commercially available focused ion beam (FIB) systems, helium ion microscopy (HIM) systems, and secondary ion mass spectroscopy (SIMS) systems.

As further noted above, the imaging system may be configured to have multiple modes. In general, a "mode" is defined by the values of parameters of the imaging system used to generate images for the specimen. Therefore, modes that are different may be different in the values for at least one of the imaging parameters of the imaging system (other than position on the specimen at which the output is generated). For example, for a light-based imaging system, different modes may use different wavelengths of light. The modes may be different in the wavelengths of light directed to the specimen as described further herein (e.g., by using different light sources, different spectral filters, etc. for different modes). In another embodiment, different modes may use different illumination channels. For example, as noted above, the imaging system may include more than one illumination channel. As such, different illumination channels may be used for different modes.

The multiple modes may also be different in illumination and/or collection/detection. For example, as described further above, the imaging system may include multiple detectors. Therefore, one of the detectors may be used for one mode and another of the detectors may be used for another mode. Furthermore, the modes may be different from each other in more than one way described herein (e.g., different modes may have one or more different illumination parameters and one or more different detection parameters). The imaging system may be configured to scan the specimen with the different modes in the same scan or different scans, e.g., depending on the capability of using multiple modes to scan the specimen at the same time.

As noted above, the imaging system may be configured for directing energy (e.g., light, electrons) to and/or scanning energy over a physical version of the specimen thereby generating actual images for the physical version of the specimen. In this manner, the imaging system may be configured as an "actual" imaging system, rather than a "virtual" system. However, a storage medium (not shown) and computer system(s) 102 shown in FIG. 1 may be configured as a "virtual" system. In particular, the storage medium and the computer system(s) are not part of imaging system 100 and do not have any capability for handling the physical version of the specimen but may be configured as a virtual inspector that performs inspection-like functions using stored detector output. Systems and methods configured as "virtual" systems are described in commonly assigned U.S. Pat. No. 8,126,255 issued on Feb. 28, 2012 to Bhaskar et al., U.S. Pat. No. 9,222,895 issued on Dec. 29, 2015 to Duffy et al., and U.S. Pat. No. 9,816,939 issued on Nov. 14, 2017 to Duffy et al., which are incorporated by reference as if fully set forth herein. The embodiments described herein may be further configured as described in these patents. For example, a computer system described herein may be further configured as described in these patents.

The system includes one or more computer systems, which may include any configuration of any of the computer subsystem(s) or system(s) described above, and possibly one or more components executed by the one or more computer systems. For example, as shown in FIG. 1, the system may include computer system 36 and one or more components 104 executed by the computer system.

The one or more computer systems are configured for collecting images of known rare defect types previously detected on one or more other specimens. For example, the computer system(s) may collect images, e.g., inspection patch images, of rare defects detected by an imaging system, e.g., a laser scanning (LS) DF inspection tool, when they occur. The images of the known rare defect types can be collected for creating a library of rare defect events that can be used as described further herein. For example, as shown in step 300 of FIG. 3, the computer system(s) may generate image library 300 containing images of known rare defect types.

The term "known rare defect types" is defined herein as a defect whose type has been previously established through some ground truth method, e.g., high resolution imaging and classification by a user or a trained classification model that is known to produce sufficiently accurate results. What makes such known defect types "rare," in the embodiments described herein, is that they occur substantially infrequently on specimens and are not expected to be present on a specimen as either a source of nuisance or as a DOI. How "infrequently" a defect has to occur in order to be considered "rare" may vary somewhat depending on the process used to form the specimens, but generally, a "rare" defect type may be considered to be a defect that appears on fewer than 1% of the specimens on which a process is performed and/or that appears on specimens no more than once per month or even once per year. In other words, the "known rare defect types" are not expected to be present on specimens even though their presence is not out of the realm of possibility, e.g., because they have been observed previously (at least once) on at least one specimen.

The act of collecting the images may take several different forms. For example, the embodiments described herein may simply receive known rare defect type images, e.g., from one or more users, from one or more other systems and methods, etc. However, the embodiments may take a more active role in collecting the known rare defect type images, e.g., by searching one or more computer-readable media such as inspection results files, historical or archived inspection databases, multiple inspection tool results databases, etc. for defects or events that meet one or more criteria, which may be determined by the computer system(s) or be selected by a user. For example, a user may be aware of a chemical-mechanical (CMP)-induced micro-scratch pattern that occurs infrequently enough that it can be considered a known rare defect type. The user or the computer system(s) may use this information to search one or more computer-readable media for any examples of defects or events that meet the criteria for a CMP-induced micro-scratch pattern. The criteria used to search may also be selected by a user or may be determined by the computer system(s), e.g., from a user-provided example of such a defect, by simulating what such a defect might look like, etc.

In one embodiment, at least one of the one or more other specimens has a specimen type different than the specimen. For example, the embodiments described herein have been shown to work well even if the known rare defect types are captured on a different layer or device. In one such example, a film deposition tool may be known to substantially infrequently form films having a thickness profile that can cause color variation in inspection tool images. If that film deposition tool is known to substantially infrequently cause such a film thickness profile on one type of specimen, the embodiments described herein or a user may determine that the same film deposition tool (or even a substantially different film deposition tool) may form a film on other specimens having the same or substantially similar thickness profiles. Therefore, it can be beneficial to include one or more images of such a specimen in the images collected as described herein as an example of a known rare defect type.

The "type" of the specimens, for which the embodiments described herein may be used, may be defined by the design of the specimens and the layer of the specimens for which the images have been generated. Examples of different types of specimens having different designs include specimens on which logic devices are being formed vs. specimens on which memory devices are being formed, specimens on which different types of logic devices are being formed, etc. Examples of different types of layers include a transistor layer vs. a metal interconnect layer, different interconnect layers, etc. Specimens having different layer types may be the same type of specimens, e.g., at different points in a process being performed on the specimens to form the same devices on the specimens, or specimens on which different types of devices are being formed.

In another embodiment, at least one of the known rare defect types was previously detected on the one or more other specimens with a specimen orientation different than a specimen orientation used for generating the runtime images. For example, the embodiments described herein have been shown to work well even if the known rare defect types are captured at a different wafer orientation.

The specimen orientation may be the orientation of the known rare defect type relative to the patterned features being formed on the specimen or the specimen itself. For example, a known rare micro-scratch defect detected on one specimen with one orientation relative to the patterned features formed on the specimen may be used to train a component to detect the same or a substantially similar micro-scratch defect type on other specimens regardless of the orientation of the micro-scratch pattern relative to the other specimen (and/or the patterned features formed thereon).

The different specimen orientations may also or alternatively be the orientation of the specimens to the imaging tool. For example, a known rare micro-scratch defect that is detected on one specimen with one orientation relative to an imaging tool may be useful for training a component to detect the same or a substantially similar micro-scratch defect type on another specimen (of the same or different type) with a different orientation relative to an imaging tool, which may or may not have a configuration that is the same as the imaging tool. More specifically, the orientation of a specimen relative to, say, an illumination plane of the imaging tool may vary depending on, for example, the patterned features being formed on the specimen, the defects being detected on the specimen, the configuration of the imaging tool, etc. Therefore, different specimens may have different orientations relative to the illumination plane when being imaged by a tool such as an inspection tool. However, regardless of the orientations of the specimens on which known rare defect types have been detected, the embodiments described herein can collect images of such defects and such images should be suitable for use in training components such as the DL models described herein.

In an additional embodiment, at least one of the known rare defect types was previously detected on the one or more other specimens with an additional imaging system having a configuration different than the imaging system. Regardless of the imaging tools that were used to generate images of the known rare defect types, one significant advantage of the embodiments described herein is that the collected images and the labels assigned thereto as described further herein can be used to train a component that is configured to determine information for a specimen from images generated by any suitable imaging tool, e.g., a LS tool, known in the art. In other words, images of the known rare defect types do not have to be detected, imaged, classified, etc. by the same tool that will be used to determine information for a specimen with a component trained using a training data set generated as described herein. In just one such example, an image generated by a BF imaging tool of a known rare defect type may be collected and labeled as described herein and included in a known rare defect type training data set. That known rare defect type training data set may then be combined with images and their labels generated for a specimen with a DF imaging tool. The final training data set may then be used to train a component configured for determining information for the specimen from images generated by the DF imaging tool.

In a further embodiment, at least one of the known rare defect types was previously detected on the one or more other specimens with an imaging mode different than a mode of the imaging system used for generating the runtime images of the specimen. For example, as described further herein, the imaging systems may be configured for two or more modes, which may be different in any illumination and/or collection/detection parameters of the imaging system. Such imaging systems may use one or more modes, i.e., single mode or multi-mode, for generating images of a specimen during a process such as an inspection process. In addition, the same imaging system may use different modes for different specimens, e.g., depending on the characteristics of the specimen. Therefore, even if a known rare defect type was detected with the same imaging system as the one that will be used to generate runtime images for the specimen that are input to the component trained as described herein, the imaging system may not use the same mode or modes for detecting the known rare defect type and generating the runtime specimen images. As a result, the images that are collected for the known rare defect types may look substantially different from any or all of the images that are generated for the specimen, even with the same imaging system. Nevertheless, these images, despite how different they may be from the specimen images, can be collected and used as described herein.

In some embodiments, at least two of the known rare defect types was previously detected on the one or more other specimens at substantially different points in time. For example, the rare defect events may be collected over a substantially long period of time, e.g., years, then added to a specimen-specific training data set as described further herein. In particular, as described further herein, the rare defect types may be infrequently detected on specimens, e.g., only once ever, once a month, once every few years, on less than 1% of the specimens, etc. Therefore, the images that are collected may have been generated at substantially different points in time spanning a substantially long period of time. In addition, different known rare defect types may have been detected at substantially different points in time, e.g., yesterday vs. years ago. The rare defect events that are accumulated over substantially long periods of time can then be collected and included in the training set for any new model being trained. In this manner, the embodiments described herein may advantageously collect historical data and use that data in combination with specimen-specific data to train a component such as DL classifier.

The one or more computer systems are also configured for assigning training labels to the images responsive to the known rare defect types in the images. For example, the computer system(s) may tag the images of the known rare defect types with unique identification codes. The unique identification codes may be different than any labels that were previously assigned to the known rare defect type images. For example, a micro-scratch defect that was previously labeled as a nuisance may instead be assigned a label indicating that it is a known rare defect type. The unique identification codes for different known rare defect types may also be different from each other, e.g., a first unique identification code for micro-scratches vs. a second, different unique identification code for a particular thin film profile. In addition, the labels assigned to the known rare defect type images are "unique" in that they are at least different from the labels used for any specimen-specific training data. For example, the computer system(s) would not assign the same label to a known rare defect type and to a specimen-specific DOI or even nuisance example. The labels may otherwise be assigned in any manner known in the art and may have any suitable form, e.g., alphanumeric, known in the art.

The one or more computer systems are further configured for storing the collected images and the assigned training labels as a rare defect type training data set. For example, the computer system(s) may be configured for collecting and grouping images of rare defect events into a "library" of classified images. In other words, the images of the rare defect types may be catalogued and grouped in a library of template images, tagged with their unique identification codes. Although the stored collected images and their assigned training labels may be referred to herein as a library or an image library, the computer system(s) may store the images and their labels in any suitable data structure having any suitable form and format known in the art. The stored collected images and the assigned training labels may be referred to herein as a "rare defect type training data set" or "rare defect library" but may also be referred to in any other suitable manner known in the art. The computer system(s) may be configured for storing the collected images and the assigned training labels as described further herein and/or in any suitable manner known in the art.

The rare defect type training data set is unsuitable for use in training a component configured for determining information for the specimen from runtime images generated for the specimen by an imaging system until the rare defect type training data set is combined with training images and corresponding training labels generated for the specimen. In other words, the rare defect type training data set is, in of itself (i.e., without any other data), unsuitable for use in training the component. For example, in one embodiment, the known rare defect types are not defects of interest (DOIs) for the specimen. In another embodiment, the runtime images are generated in a process configured to not detect the known rare defect types on the specimen. In this manner, because the known rare defect types are not DOIs for the specimen and/or because the process is not configured for detecting the known rare defect types on the specimen, unless the rare defect library is combined with specimen-specific training data, any component trained with only the rare defect library will be unsuitable for determining the intended information for the specimen.

More specifically, the known rare defect types do not include DOIs, even if the DOIs are relatively rare. For example, a known rare defect type may only occur once on less than 1% of all of the specimens, while a DOI may occur a few times on most specimens. In addition, the known rare defect types will most likely have substantially different characteristics than DOIs. Therefore, until the rare defect library is combined with specimen-specific images and labels for the DOIs, the rare defect library in all probability could not be used to train a component such as those described herein to detect or classify DOIs on the specimen. As a result, any component trained with only the rare defect library would most likely not be suitably trained for detecting the DOIs on the specimen. However, as described further herein, by combining the rare defect library with specimen-specific training data, components trained with such combined information could detect DOIs on a specimen while also differentiating the DOIs from any known rare defect types in the unlikely event that they are present on the specimen.

Figure 3:
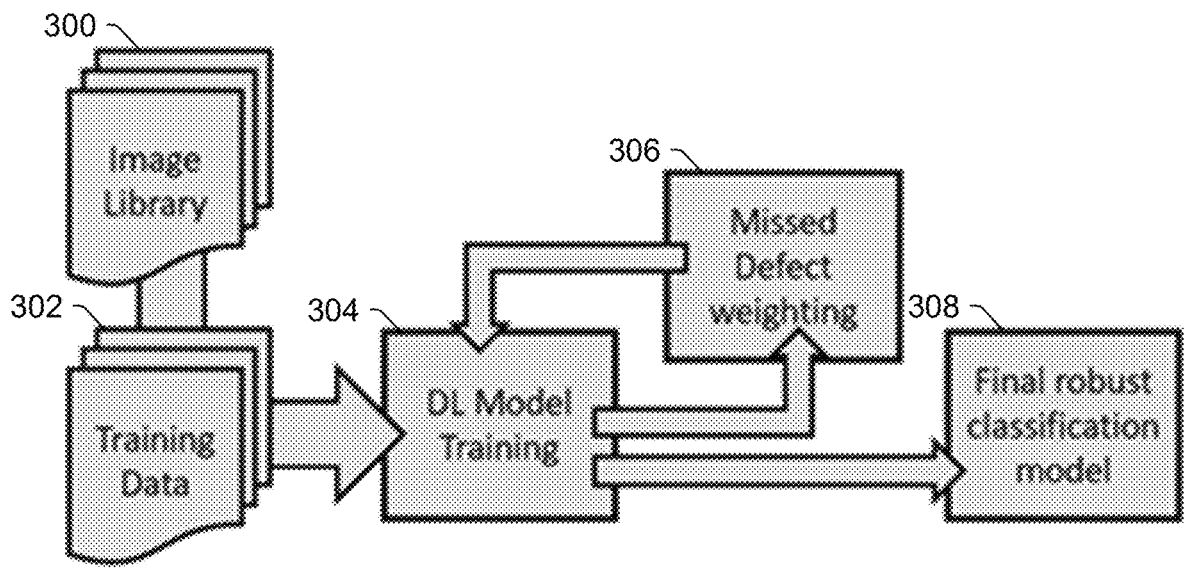
FIG. 3 is a flow chart illustrating an embodiment of steps that may be performed for determining information for a specimen.

In this manner, the embodiments described herein can create and use a library of rare defect events, collected over relatively long periods of time, that can be added to a specimen-specific training set to strengthen the component's accuracy in correctly classifying similar defects in future inspections. As shown in FIG. 3, image library 300 that includes images of known rare defect types may be combined with training data 302 for a specimen and then used in step 304 for DL model training. As an example, wafer processing equipment such as a CMP tool may experience a rare excursion that results in a set of defects such as micro-scratches arrayed in a distinctive pattern. Unless the defect binning model was trained on these micro-scratches, it may fail to accurately recognize and classify them should such an excursion happen again. The user can add these micro-scratch defects to a library of template defects. Every time a model is being trained, even if it is for a different device or layer, these libraries can be added to the training set. This greatly increases the versatility and accuracy of the resulting classification model.

In an additional embodiment, the one or more computer systems are also configured for collecting additional images of known tool excursion events previously detected on one or more additional specimens. In this manner, the computer system(s) may collect images, e.g., inspection patch images, of tool excursion events detected by an imaging system, e.g., an LS DF inspection tool, when they occur. The known tool excursion event images may be collected in the same manner described further herein.

The tool excursion events may be caused by a tool that intentionally alters the specimen in some manner, e.g., a fabrication process tool such as a CMP tool, or a tool that did not intentionally produce any changes in the specimen, e.g., an inspection tool, a defect review tool, etc. A "tool excursion event" as that term is used herein is defined as a situation in which a tool failed, in whole or in part, to perform an intended process on a specimen.

Some known rare defect types may also be tool excursion events, e.g., when a CMP tool produces significant microscratches on a specimen or when a lithography tool has clearly gone out of its process window evidenced by an entire layer of patterned features having incorrect characteristics. However, tool excursion events may also include events that are not really defect types. For example, a tool excursion event may be a situation in which a deposition tool fails to form any film at all on a specimen. In another example, a tool excursion event may be a situation in which an inspection tool has inadvertently been modified so that all of the images it generates of a specimen are out of focus and therefore largely useless for detecting defects on the specimen. In this manner, a tool excursion event may be a situation in which a tool has failed to such a degree that any results it produces cannot be considered a rare defect event but are more accurately classified as a tool excursion.

The known tool excursion events may be rare in the same manner described above with respect to the known rare defect types. The known tool excursion events may also be identified as described further herein, e.g., with a ground truth method, by a user, etc. In addition, the tool excursion events may have one or more characteristics described above with respect to the known rare defect types. For example, the known tool excursion events may be detected on an additional specimen that has a different type than the specimen. At least one of the tool excursion events may be previously detected on the one or more additional specimens with a specimen orientation different than a specimen orientation used for generating the runtime images. At least one of the tool excursion events may be previously detected on the one or more additional specimens with an additional imaging system having a configuration different than the imaging system. At least one of the tool excursion events may be previously detected on the one or more additional specimens with an imaging mode different than a mode of the imaging system used for generating the runtime images of the specimen. In addition, at least two of the known tool excursion events may be previously detected on the one or more additional specimens at substantially different points in time.

The one or more computer systems are also configured for assigning additional training labels to the additional images responsive to the known tool excursion events in the additional images. For example, the computer system(s) may tag the images of the known tool excursion events with unique identification codes. The identification codes assigned to the known tool excursion events may be unique in the same manner described further herein and may be assigned as described further herein. In addition, the labels assigned to the tool excursion event images may be unique as described further herein with respect to both the known rare defect type training labels and the specimen-specific training labels.

The one or more computer systems are further configured for storing the collected additional images and the assigned additional training labels as a tool excursion training data set. The collected tool excursion event images and their training labels may be stored as described further herein. For example, the computer system(s) may catalogue and group the images of the known tool excursion events, tagged with their unique identification codes, in a library of template images. The computer system(s) may store the rare defect library and the known tool excursion event library as separate libraries, so that they may be used separately or collectively. However, the computer system(s) may store the rare defect library and the tool excursion event library as a single library, e.g., as a rare event library. The entire rare event library may be used as described further herein. In some situations though, different portions of the library may be combined with different specimen-specific training data sets as described further herein depending on, for example, the component being trained, the process in which the component will be used, etc. In this manner, only a portion of the entire rare event library may be used as described further herein.

The tool excursion training data set is unsuitable for use in training the component until the tool excursion training data set is combined with the training images and the corresponding training labels generated for the specimen. However, during the training of components described herein such as new classification models, these saved library images can be combined with a specimen-specific training data set, so that the resulting model will be able to correctly classify the tool excursion events should they occur on any future specimens and be detected in any future inspection or other process performed on those specimens regardless of the device or layer being trained. Over time, all relevant tool excursion events may be encountered. Including them in the training process of new DL (and other) models can make these (and other) models much more robust and capable of identifying these relatively rare occurrences.

In a further embodiment, the rare defect type training data set is unsuitable for use in training an additional component configured for determining information for an additional specimen from additional runtime images generated for the additional specimen by an additional imaging system until the rare defect type training data set is combined with additional training images and corresponding additional training labels generated for the additional specimen. For example, in the same way that the rare defect library and the tool excursion library are unsuitable for training a component for determining information for a specimen, they are also unsuitable for training the same or other components for determining information for other specimens (which may be different in one or more ways described herein). In one such embodiment, the specimen and the additional specimen have different layer types. In another such embodiment, different types of devices are being formed on the specimen and the additional specimen. These specimens may be different in these ways as described further herein.

The rare defect library and the tool excursion library are not, in other words, a specimen-specific training data set that was used for one specimen and are being reused (modified or not) for another specimen. Instead, the rare defect library and the tool excursion library are unsuitable, in and of themselves, for training any component described herein for determining any information for any specimen described herein. However, as described further herein, by combining the rare defect library and/or the tool excursion library with different specimen-specific training sets, the same rare defect library and tool excursion library can be used to, in part, train different components for determining information for different specimens. In other words, the rare defect library and the tool excursion library can be reused for generating different training sets (by being combined with different specimen-specific training sets, respectively) that can be used for training different components configured for determining (the same or different) information for different specimens. For example, the same rare defect library and tool excursion event library can be included in training data sets for both DL defect detection models and DL defect classifiers for the same specimen.

Therefore, the rare defect and tool excursion libraries may be, in of themselves, relatively useless as training data sets for the applications described herein but may be combined with various specimen-specific data sets and therefore be used and reused for making different DL (and other models, components, methods, algorithms, etc.) more robust. For example, in the same way that the rare defect library and tool excursion event library are unsuitable for use in training a component configured as described herein until the rare defect type training data set is combined with training images and corresponding training labels generated for the specimen, the specimen-specific training data set is also unsuitable for use in training a component configured for detecting the rare defects and/or tools excursion events from runtime images generated for the specimen until the specimen-specific training data set is combined with the rare defect library and/or tool excursion event library, respectively. In other words, the training images and corresponding training labels generated for the specimen are unsuitable to train a component to capture and recognize rare defect types (possibly caused by tool excursion events) until combined with the stored rare defect type and/or tool excursion event training data set. Therefore, combining these saved rare defect types with the specimen-specific training data set advantageously makes the specimen-specific training set more robust against missing these rare defect types should they occur during an inspection of a specimen.

The term "component" as used herein can be generally defined as any software and/or hardware that can be executed by a computer system. The component may have different forms such as an algorithm, a model, a method, and combinations thereof. More generally, a component as that term is used herein is any element into which a computer system can input a specimen image and that is configured to determine information for a specimen from the input specimen image. In addition, a component as that term is used herein may be any component that needs to be trained as described herein prior to being used to determine information for a specimen. Although some exemplary examples of components are described herein, it will be obvious to one of ordinary skill in the art that the component may have many other variations depending on the application for which it will be used, e.g., the specimen itself, the information being determined for the specimen, the imaging tool that generated the input images, etc.

In one embodiment, the component includes a deep learning (DL) model. Generally speaking, "deep learning" (also known as deep structured learning, hierarchical learning or deep machine learning) is a branch of machine learning (ML) based on a set of algorithms that attempt to model high level abstractions in data. In a DL-based model, there are typically many layers between the input and output, allowing the algorithm to use multiple processing layers, composed of, for example, multiple linear and non-linear transformations. DL methods are based on learning representations of data. In one such example, an observation (e.g., an image) can be represented in many ways such as a vector of intensity values per pixel, or in a more abstract way as a set of edges, regions of particular shape, etc.

A DL model can also be generally defined as a model that is probabilistic in nature. In other words, a DL model is not one that performs forward simulation or rule-based approaches and, as such, a model of the physics of the processes involved is not necessary. Instead, as described further herein, the DL model can be learned (in that its parameters can be learned) based on a suitable training set of data. The DL model may have or include any suitable DL architecture such as any convolutional neural network (CNN) architecture known in the art. If the DL model is or includes a CNN, the CNN may include any suitable types of layers such as convolution, pooling, fully connected, soft max, etc., layers having any suitable configuration known in the art.

Although the embodiments described herein are particularly suitable for generating rare defect libraries (and tool excursion event libraries) that can be combined with specimen-specific training data and then used for training a DL model, other models, methods, algorithms, etc. can be advantageously trained using the same libraries when combined with the specimen-specific training data suitable for those models, methods, algorithms, etc. For example, even though the rare defect event library may be particularly suitable for training a DL defect classifier (after being combined with specimen-specific training data), the rare defect event library may be useful in the same manner for non-DL defect classifiers, e.g., decision trees, rule-based classifiers, etc.

In some embodiments, the information determined for the specimen by the component includes information for defects on the specimen. For example, the component may be configured for any defect-related application in addition to (or instead of) defect classifying described further herein. In one such example, DL and non-DL defect detection algorithms and methods must be trained before use, usually with some examples of DOIs, nuisances, defect-free images, etc. In the same manner described further herein, the rare defect library and/or tool excursion library generated as described herein may be combined with a specimen-specific training data set and then used to train a defect detection method or algorithm. In the same way, such libraries can be combined with specimen-specific training data to train a method and/or algorithm for nuisance filtering, which may be considered a kind of defect classification in some situations. The defect detection and nuisance filtering methods and algorithms that may be trained with such libraries combined with specimen-specific training data may include any such methods and algorithms known in the art.

Some examples of ML based defect detectors are described in U.S. Pat. No. 10,186,026 issued Jan. 22, 2019 to Karsenti et al., which is incorporated by reference as if fully set forth herein. Some examples of defect detection components that may also perform defect classification and are ML based are described in U.S. Pat. No. 10,607,119 issued Mar. 31, 2020 to He et al., which is incorporated by reference as if fully set forth herein. The embodiments described herein may be further configured as described in these patents.

In another embodiment, the component is configured for determining the information by classifying defects detected in the runtime images. Classifying defects generally includes determining a type of a detected defect. Classifying defects may also be referred to as "binning" defects. Classifying defects is often performed after defect detection and nuisance filtering although that is not necessary. For example, as mentioned above, in the broadest term definition, classifying defects may include nuisance filtering. However, classifying defects, as that term is used herein, is not just filtering nuisances from detected defects but also (or at least) separating defects into different bins corresponding to different types of defects, e.g., a bridge type defect, a missing pattern type defect, etc. As also described further herein, if the component is configured for classifying defects, the component may be a DL component or a non-DL component.

The DL defect classification component may be configured as described in U.S. U.S. Pat. No. 10,043,261 issued Aug. 7, 2018 to Bhaskar et al., U.S. Pat. No. 10,360,477 issued Jul. 23, 2019 to Bhaskar et al., U.S. Pat. No. 10,607,119 issued Mar. 31, 2020 to He et al., and U.S. Pat. No. 11,580,398 issued Feb. 14, 2023 to Zhang et al., which are incorporated by reference as if fully set forth herein. The embodiments described herein may be further configured as described in these patents. Additional examples of classifiers that may be used as the component in the embodiments described herein are described in U.S. Patent Application Publication Nos. 2015/0254832 by Plihal published Sep. 10, 2015, 2015/0262038 by Konuru published Sep. 17, 2015, 2016/0258879 by Liang et al. published Sep. 8, 2016, and 2017/0082555 by He et al. published Mar. 23, 2017, which are incorporated by reference as if fully set forth herein. The classifiers described herein may be configured as described in these publications.

In some embodiments, the system includes the component configured for determining the information for the specimen from the runtime images generated for the specimen. For example, the system may be configured only for generating one or more of the libraries described herein. The system may then make the generated library or libraries available to one or more other methods or systems that are configured for combining the library or libraries with specimen-specific training data and/or training the component, which may be performed as described further herein. Those other methods or systems may or may not be configured to deploy the component. For example, one system or method may train the component, and another system or method may be configured to use the component during a process performed on a specimen.

The embodiments described herein may also be configured to perform such functions. For example, if the system includes the component, the system may be configured to generate a final training data set by combining the rare defect library and/or the tool excursion library with a specimen-specific training data set and then to train the component with the final training set to determine information for the specimen from the runtime images generated for the specimen. If the system also includes the imaging system, the system may generate the runtime images and then input the runtime images into the component to thereby determine the information for the specimen. In this manner, the systems and methods described herein may include all of the necessary hardware and other components needed to perform a process on the specimen for determining information for the specimen. As such, the systems and methods described herein may be configured for generating a rare defect library and/or a tool excursion library on-tool or off-tool.

The embodiments described herein may or may not be configured for generating the training images and corresponding training labels for the specimen, i.e., the specimen-specific training data set. For example, the specimen-specific training data set may be generated by another method or system and may be acquired by the embodiments described herein in any suitable manner known in the art, e.g., from a computer-readable medium accessible by both the other method or system and the embodiments described herein. The embodiments described herein may then combine the rare defect type training data set (and/or the tool excursion library) with the specimen-specific training data set to generate a final training data set that is then used for training the component. As described further herein, training the component may be performed by the embodiments described herein or by another system or method.

Generating the specimen-specific training data set, whether performed by the embodiments described herein or another system or method, may be performed in any suitable manner known in the art. For example, before training a component such as a DL model, the ground truth training data has to be established. Typically, that process involves scanning electron microscope (SEM) reviewing a set of DOIs. These DOIs may then be classified by human operators or by an automated classification system, whose performance has already been established, on the SEM tool. So, for example, the SEM operator classifies and labels a certain defect as a critical DOI. The subsequent LS (or other) detection system is then trained on a set of defects that includes the labeled DOI.

In another embodiment, the one or more computer systems are configured for generating a training data set for the component by combining the rare defect type training data set with the training images and the corresponding training labels generated for the specimen, training the component with the training data set, and determining information for the specimen by inputting the runtime images into the trained component. The specimen-specific training data set may be combined with the rare defect library and/or tool excursion library in any suitable manner. Training the component may be performed as described further herein. Inputting runtime images into the trained component may be performed in any suitable manner known in the art.

In this manner, the embodiments described herein may not just generate a rare defect event and/or tool excursion event training data set, but may also combine that training set with a specimen suitable training data set that can be used to train a model to determine information for the specimen. For example, as described further herein, during training of new classification models, the saved library images can be combined with a specimen-specific training data set so that the resulting model trained on the combined training data set will be able to recognize and correctly classify these rare defect events and/or tool excursion events should they occur in any future process performed on any future specimen. In addition, the rare defect event and/or tool excursion event training data sets generated as described herein can be combined with any specimen-specific training data set regardless of the device or layer for which the component is being trained. The embodiments described herein may also be configured for (or at least enable) adding the library images to a training set of every subsequent model training.

As described further herein, one significant advantage of the embodiments described herein and one significant improvement over other currently used methods and systems for training DL type classification models is that over time, all relevant rare defect types and/or tool excursion events will have been encountered. In particular, the embodiments described herein will greatly improve the odds that a trained model will accurately identify any rare future defect event if it bears any similarity to a cached set of images in the library, even if these rare events and the library images occurred on different layers, devices, and/or specimen orientation. In addition, these new methods can substantially improve accuracy of the trained model for all information determined for the specimen, including DOIs and non-DOIs, e.g., the known rare defect types, the tool excursion events, other nuisances, etc. Including them in the training process of new DL models will make these models much more robust and capable of identifying these rare occurrences.

Training performed with the resulting training dataset may otherwise be performed in any suitable manner known in the art. For example, the training will generally include altering one or more parameters of the component until the output generated by the component matches (or substantially matches) the training labels assigned to the training data. The one or more parameters of the component that are altered during training may include any modifiable parameters of the component. The computer system(s) may be configured to train the component as described in U.S. Patent Application Publication Nos. 2017/0193400 published Jul. 6, 2017 by Bhaskar et al., 2018/0107928 published Apr. 19, 2018 by Zhang et al., and 2019/0370955 published Dec. 5, 2019 by Zhang et al., which are incorporated by reference as if fully set forth herein. The embodiments described herein may be further configured as described in these publications.

In one such embodiment, the one or more computer systems are configured for identifying a defect in the training images that is misclassified during the training, assigning to the identified defect a unique identification code and a new weight higher than a weight previously assigned to the identified defect, modifying a specimen training data set including the training images and the corresponding training labels with the unique identification code and the new weight, and retraining the component with the rare defect type training data set combined with the modified specimen training data set. In this manner, one significant advantage of the embodiments described herein that provides an improvement over currently used methods and systems is that individual defects, which are of great importance to be accurately identified, can be weighted more heavily, to ensure that their classification by the component is correct. For example, after the training, the component can be validated by comparing its output against the ground truth. It is at this point that any defect that was misclassified by the trained component can be identified. If this defect is erroneously put in a nuisance bin, it could be discarded or filtered out. In this manner, during the validation process of a trained model, it may occur that an important defect is missed or erroneously classified as a nuisance defect, which would then be discarded. But once this defect has been identified, e.g., by a user, it can be reassigned a distinct identification code. When the model is being retrained, this defect code can be given a much higher weight. This will increase the probability that this particular defect will get classified correctly or at least the likelihood of a correct binning will increase significantly. For example, as shown in step 306 of FIG. 3, the computer system(s) may assign missed defect weighting to any misclassified defects identified during validation. The missed defect weighting assigned in step 306 may then be fed back to DL model training 304 and used to retrain the DL model in this step, which can thereby generate final robust classification model 308.

In some such embodiments, the one or more computer systems are also configured to assign the new weight so that the identified defect is included in each training epoch performed for the retraining. When the model is being retrained, this defect code can be given a much higher weight, such that it will appear in the training set during every epoch. This will ensure that this particular defect will get classified correctly or at least the likelihood of a correct binning will increase significantly. For example, if a DOI is misclassified as a nuisance defect and thus prone to being discarded by the component, this defect can be reintroduced with a much-increased weight such that it will occur during every epoch in the retraining of the component. This way, the model is much more likely to correctly identify that previously misclassified defect.

In a further such embodiment, identifying the defect that is misclassified is performed based on information received from a user. For example, the embodiments described herein may be configured to allow the user to identify individual defect patch images that may have been misclassified during the initial training. This can happen for several reasons such as faulty ground truth, noisy background, or partially obscured defects, etc. In the embodiments described herein, the user may be able to visually identify the misclassified defects, in particular defects of great interest to the user that may have been discarded as nuisance defects. Such defects can then be assigned a new unique identification code. During retraining of the model, such defects can be weighted much more heavily such that it will occur during each training epoch. This will greatly increase the probability that the retrained model will correctly identify and flag this defect as well as similar defects. This makes the resulting DL classification model more accurate and reduces the likelihood that an important defect is missed.

Identifying the defect that is misclassified based on information from a user may simply include receiving the defect misclassification indication or information from a user and then modifying the defect information (e.g., label) to indicate that it was misclassified. However, the embodiments described herein may be configured to perform this step with little or no input from the user. For example, the ground truth may be established by an automated (DL or otherwise) classification method on a defect review tool such as a SEM. A small number of defects may then be labeled as "critical." On training the component, these "critical" defects can then be treated according to the embodiments described herein, e.g., by iteratively increasing their weight during the training until the component classifies them correctly.

In some embodiments, the computer system(s) are configured for storing information for at least the rare defect library, but also possibly the tool excursion library, the training set resulting from combining such a library or libraries with specimen-specific training data, a component trained with such a training set, etc. The computer system(s) may be configured to store any of such information in a recipe or by generating a recipe for the process in which the data or component will be used. A "recipe" as that term is used herein can be generally defined as a set of instructions that can be used by a tool to perform a process. In this manner, generating a recipe may include generating information for how a process is to be performed, which can then be used to generate the instructions for performing that process. The information that is stored by the computer system(s) may include any information that can be generated by the computer system(s) as described further herein.

The computer system(s) may be configured for storing the information in any suitable computer-readable storage medium. The information may be stored in any manner known in the art. The storage medium may include any storage medium described herein or any other suitable storage medium known in the art. After the information has been stored, the information can be accessed in the storage medium and used by any of the method or system embodiments described herein, formatted for display to a user, used by another software module, method, or system, etc. For example, the embodiments described herein may generate a recipe as described above. That recipe may then be stored and used by the system or method (or another system or method) to perform a process.

The computer system(s) may also be configured for generating results that include information for the specimen, which may include any of the results or information described herein. For example, as described further above, the computer system(s) may be included in a system that determines information for defects on the specimen by inputting the runtime specimen images into the trained component. The results generated in this manner may be output by the computer system(s) in any suitable manner. All of the embodiments described herein may be configured for storing results of one or more steps of the embodiments in a computer-readable storage medium. The results may include any of the results described herein and may be stored in any manner known in the art. The results may have any suitable form or format such as a standard file type. The storage medium may include any storage medium described herein or any other suitable storage medium known in the art.

After the results have been stored, the results can be accessed in the storage medium and used by any of the method or system embodiments described herein, formatted for display to a user, used by another software module, method, or system, etc. to perform one or more functions for the specimen or another specimen of the same type. For example, results produced by the computer system(s) described herein may include information for any defects detected on the specimen such as location, etc., of the bounding boxes of the detected defects, detection scores, information about defect classifications such as class labels or IDs, any defect attributes determined from any of the images, or any other such suitable information known in the art. That information may be used by the computer system(s) or another system or method for performing additional functions for the specimen and/or the detected defects such as sampling the defects for defect analysis, determining a root cause of the defects, etc.

Such functions also include, but are not limited to, altering a process such as a fabrication process or step that was or will be performed on the specimen in a feedback or feedforward manner, etc. For example, the computer system(s) may be configured to determine one or more changes to a process that was performed on the specimen and/or a process that will be performed on the specimen based on the defect detection and/or classification results. The changes to the process may include any suitable changes to one or more parameters of the process. In one such example, the computer system(s) preferably determine those changes such that the defects can be reduced or prevented on other specimens on which the revised process is performed, the defects can be corrected or eliminated on the specimen in another process performed on the specimen, the defects can be compensated for in another process performed on the specimen, etc. The computer system(s) may determine such changes in any suitable manner known in the art.

Those changes can then be sent to a semiconductor fabrication system (not shown) or a storage medium (not shown) accessible to both the computer system(s) and the semiconductor fabrication system. The semiconductor fabrication system may or may not be part of the system embodiments described herein. For example, the imaging system and/or the computer system(s) described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a CMP tool, a deposition tool, and the like.

Each of the embodiments described above may be combined together into one single embodiment. In other words, unless otherwise noted herein, none of the embodiments are mutually exclusive of any other embodiments.

Another embodiment relates to a computer-implemented method for determining information for a specimen. The method includes the collecting, assigning, and storing steps described further herein. These steps are performed by one or more computer systems, which may be configured according to any of the embodiments described herein. Each of the steps of the method may be performed as described further herein. The method may also include any other step(s) that can be performed by the imaging system, computer system(s), and/or components described herein. In addition, the method described above may be performed by any of the system embodiments described herein.

Figure 4:
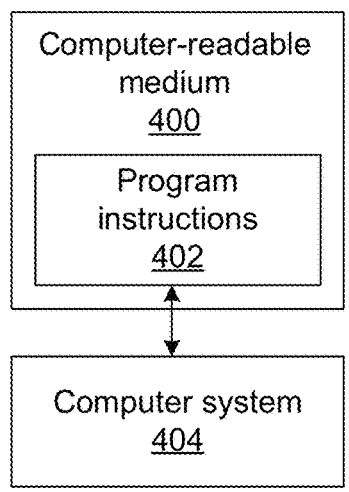
FIG. 4 is a block diagram illustrating one embodiment of a non-transitory computer-readable medium storing program instructions for causing one or more computer systems to perform a computer-implemented method described herein.

An additional embodiment relates to a non-transitory computer-readable medium storing program instructions executable on one or more computer systems for performing a computer-implemented method for determining information for a specimen. One such embodiment is shown in FIG. 4. In particular, as shown in FIG. 4, non-transitory computer-readable medium 400 includes program instructions 402 executable on computer system 404. The computer-implemented method may include any step(s) of any method(s) described herein.

Program instructions 402 implementing methods such as those described herein may be stored on computer-readable medium 400. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension), Python, Tensorflow, or other technologies or methodologies, as desired.

Computer system 404 may be configured according to any of the embodiments described herein.

Further modifications and alternative embodiments of various aspects of the invention will be apparent to those skilled in the art in view of this description. For example, methods and systems for determining information for a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain attributes of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A system configured for determining information for a specimen, comprising:
   one or more computer systems configured for:
      collecting images of known rare defect types previously detected on one or more other specimens;
      assigning training labels to the images responsive to the known rare defect types in the images; and
      storing the collected images and the assigned training labels as a rare defect type training data set, wherein the rare defect type training data set is unsuitable for use in training a component configured for determining information for the specimen from runtime images generated for the specimen by an imaging system until the rare defect type training data set is combined with training images and corresponding training labels generated for the specimen.

2. The system of claim 1, wherein the known rare defect types are not defects of interest for the specimen.

3. The system of claim 1, wherein the runtime images are generated in a process configured to not detect the known rare defect types on the specimen.

4. The system of claim 1, wherein at least one of the one or more other specimens has a specimen type different than the specimen.

5. The system of claim 1, wherein at least one of the known rare defect types was previously detected on the one or more other specimens with a specimen orientation different than a specimen orientation used for generating the runtime images.

6. The system of claim 1, wherein at least one of the known rare defect types was previously detected on the one or more other specimens with an additional imaging system having a configuration different than the imaging system.

7. The system of claim 1, wherein at least one of the known rare defect types was previously detected on the one or more other specimens with an imaging mode different than a mode of the imaging system used for generating the runtime images of the specimen.

8. The system of claim 1, wherein at least two of the known rare defect types were previously detected on the one or more other specimens at substantially different points in time.

9. The system of claim 1, wherein the one or more computer systems are further configured for:
   collecting additional images of known tool excursion events previously detected on one or more additional specimens;
   assigning additional training labels to the additional images responsive to the known tool excursion events in the additional images; and
   storing the collected additional images and the assigned additional training labels as a tool excursion training data set, wherein the tool excursion training data set is unsuitable for use in said training the component until the tool excursion training data set is combined with the training images and the corresponding training labels generated for the specimen.

10. The system of claim 1, wherein the rare defect type training data set is unsuitable for use in training an additional component configured for determining information for an additional specimen from additional runtime images generated for the additional specimen by an additional imaging system until the rare defect type training data set is combined with additional training images and corresponding additional training labels generated for the additional specimen.

11. The system of claim 10, wherein the specimen and the additional specimen have different layer types.

12. The system of claim 10, wherein different types of devices are being formed on the specimen and the additional specimen.

13. The system of claim 1, wherein the component comprises a deep learning model.

14. The system of claim 1, wherein the component is further configured for determining the information by classifying defects detected in the runtime images.

15. The system of claim 14, wherein the one or more computer systems are further configured for identifying a defect in the training images that is misclassified during the training, assigning to the identified defect a unique identification code and a new weight higher than a weight previously assigned to the identified defect, modifying a specimen training data set comprising the training images and the corresponding training labels with the unique identification code and the new weight, and retraining the component with the rare defect type training data set combined with the modified specimen training data set.

16. The system of claim 15, wherein the one or more computer systems are further configured to assign the new weight so that the identified defect is included in each training epoch performed for the retraining.

17. The system of claim 15, wherein identifying the defect that is misclassified is performed based on information received from a user.

18. The system of claim 1, wherein the information determined for the specimen by the component comprises information for defects on the specimen.

19. The system of claim 1, further comprising the component configured for determining the information for the specimen from the runtime images generated for the specimen.

20. The system of claim 1, wherein the one or more computer systems are further configured for generating a training data set for the component by combining the rare defect type training data set with the training images and the corresponding training labels generated for the specimen, training the component with the training data set, and determining information for the specimen by inputting the runtime images into the trained component.

21. The system of claim 1, wherein the imaging system is configured as a light scattering dark field inspection system.

22. A non-transitory computer-readable medium, storing program instructions executable on one or more computer systems for performing a computer-implemented method for determining information for a specimen, wherein the computer-implemented method comprises:
   collecting images of known rare defect types previously detected on one or more other specimens;
   assigning training labels to the images responsive to the known rare defect types in the images; and storing the collected images and the assigned training labels as a rare defect type training data set, wherein the rare defect type training data set is unsuitable for use in training a component configured for determining information for the specimen from runtime images generated for the specimen by an imaging system until the rare defect type training data set is combined with training images and corresponding training labels generated for the specimen.

23. A computer-implemented method for determining information for a specimen, comprising:

collecting images of known rare defect types previously detected on one or more other specimens;

assigning training labels to the images responsive to the known rare defect types in the images; and storing the collected images and the assigned training labels as a rare defect type training data set, wherein the rare defect type training data set is unsuitable for use in training a component configured for determining information for the specimen from runtime images generated for the specimen by an imaging system until the rare defect type training data set is combined with training images and corresponding training labels generated for the specimen, and wherein said collecting, assigning, and storing are performed by one or more computer systems.

* * * * *